(12) United States Patent
Oya

(10) Patent No.: US 9,956,828 B2
(45) Date of Patent: May 1, 2018

(54) HEAVY DUTY PNEUMATIC TIRE

(71) Applicant: SUMITOMO RUBBER INDUSTRIES, LTD., Kobe-shi, Hyogo (JP)

(72) Inventor: Yukihide Oya, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 839 days.

(21) Appl. No.: 14/354,666

(22) PCT Filed: Oct. 1, 2012

(86) PCT No.: PCT/JP2012/075302
§ 371 (c)(1),
(2) Date: Apr. 28, 2014

(87) PCT Pub. No.: WO2013/105309
PCT Pub. Date: Jul. 18, 2013

(65) Prior Publication Data
US 2014/0311649 A1    Oct. 23, 2014

(30) Foreign Application Priority Data

Jan. 12, 2012    (JP) .................................. 2012-004109

(51) Int. Cl.
*B60C 15/02* (2006.01)
*B60C 15/04* (2006.01)
(Continued)

(52) U.S. Cl.
CPC ............ *B60C 15/04* (2013.01); *B60C 15/024* (2013.01); *B60C 15/0607* (2013.01);
(Continued)

(58) Field of Classification Search
CPC ... B60C 15/024; B60C 15/04; B60C 15/0607; B60C 2015/0617; B60C 2015/0614; B60C 2015/061; B60C 2200/06; B60C 15/02
(Continued)

(56) References Cited

U.S. PATENT DOCUMENTS 6,044,885 A    4/2000 Kato
2003/0209302 A1* 11/2003 Hanya ................... B60C 15/024
152/454

(Continued)

FOREIGN PATENT DOCUMENTS

EP    1361076 A1    11/2003
EP    2196327 A2    6/2010
(Continued)

OTHER PUBLICATIONS

Machine translation of JP01-317814 (no date).*

*Primary Examiner* — Michael H Wilson
*Assistant Examiner* — Philip N Schwartz
(74) *Attorney, Agent, or Firm* — Birch, Stewart, Kolasch & Birch, LLP

(57) ABSTRACT

A heavy duty pneumatic tire includes a clinch portion extending from the sidewalls to the beads. A concave curved surface extends on an outer surface of the clinch portion in a circumferential direction. A convex curved surface is engageable with the concave curved surface. A ratio R1/R2 of a radius of curvature of the concave curved surface to a radius of curvature of the convex curved surface, satisfies $1.7 \leq R1/R2 \leq 3.9$, a ratio D1/R2 of a depth of the concave curved surface to the radius of curvature of the convex curved surface satisfies $0.05 \leq D1/R2 \leq 0.09$, and the radius of curvature R1 of the concave curved surface and the radius of curvature R2 of the convex curved surface are each a radius
(Continued)

of curvature of an arc on a cross section as taken along a plane including a center axis of the tire.

5 Claims, 2 Drawing Sheets

(51) Int. Cl.
*B60C 15/024* (2006.01)
*B60C 15/06* (2006.01)

(52) U.S. Cl.
CPC ............. *B60C 2015/061* (2013.01); *B60C 2015/0614* (2013.01); *B60C 2015/0617* (2013.01); *B60C 2200/06* (2013.01); *Y10T 152/10819* (2015.01)

(58) Field of Classification Search
USPC ........................................ 152/544
See application file for complete search history.

(56) References Cited

U.S. PATENT DOCUMENTS

| 2005/0211359 A1* | 9/2005 | Yoshinaka | B60C 15/024 152/454 |
| 2005/0252593 A1* | 11/2005 | Monnerie | B60C 9/023 152/454 |
| 2010/0263779 A1 | 10/2010 | Riegel et al. | |

FOREIGN PATENT DOCUMENTS

| JP | 55-91409 A | 7/1980 | |
| JP | 01317814 A * | 12/1989 | ............ B60C 15/00 |
| JP | 09-263113 A | 10/1997 | |
| JP | 2004-306823 A | 11/2004 | |
| JP | 3643191 B2 | 4/2005 | |
| JP | 2011-500413 A | 1/2011 | |

* cited by examiner

HEAVY DUTY PNEUMATIC TIRE

TECHNICAL FIELD

The present invention relates to heavy duty pneumatic tires. More specifically, the present invention relates to heavy duty pneumatic tires that are to be mounted to trucks, buses, and the like.

BACKGROUND ART

For tires, for use in trucks and buses, to which heavy load is applied, attention is paid to stiffness in bead portions thereof. This is because deformation at the bead portions is increased under a load. Namely, the bead portions are deformed and deflected in the axially outward direction under a load. In the side portions of a tire, the greater the height from a bead base line is (near a portion having a maximal width), the greater the deformation is under a load. An end of a turned-up portion of a carcass ply is positioned near the mid-portion, in the radial direction, of a bead apex. The higher a position of the end of the turned-up portion is, the greater the movement of the end is. As a result, damage such as removal of the turned-up portion is likely to occur. Namely, durability of the bead portion is reduced. According to market research, much damage at side portions of tires occurs near the ends of the turned-up portions in general.

On the other hand, reduction in weight of tires for use in trucks and buses is highly required in the market. As a method for reducing a weight of a heavy duty pneumatic tire, reduction in thickness of the bead apexes may be selected. The reduction in thickness of the bead apexes causes reduction in stiffness of the bead portions. Deflection of the bead portion in a direction outward of the tire is increased under a load. Deformation of the bead portion is increased. As described above, the end of the turned-up portion of the carcass ply is positioned near the mid-portion, in the radial direction, of the bead apex. Accordingly, movement of the end of the turned-up portion is increased, whereby damage such as removal is more likely to occur. This is confirmed by a quantitative determination using a finite element method and a CT scan. A tire structure which does not reduce durability of bead portions even when the thickness of the bead apexes is reduced for, for example, reducing weight of tires, is strongly required.

A technique for solving the aforementioned problem has been suggested. The technique is associated with, for example, a radial tire for use in trucks and buses as disclosed in Japanese Patent No. 3643191. In this tire, side surface rubber portions of bead portions include curved concave portions with which curved convex portions at edges of flange portions (hereinafter, referred to as rim flange) of a rim are engageable. The curved convex portion of the rim flange engages with and fits into the curved concave portion of the bead portion when an internal pressure and load are applied to the tire. As a result, a contact pressure between the curved concave portion of the bead portion and the curved convex portion of the rim flange may become uniform. Further, a creep change amount in the side surface rubber portion may be reduced.

However, in the technique described above, a radius of curvature of the curved concave portion of the bead portion is set so as to have a value approximate to a value of a radius of curvature of the curved convex portion of the rim flange, such that the curved convex portion of the rim flange fits well into the curved concave portion of the bead portion. As a result, when the tire is under a load and the bead portion is deflected outward, distortion is likely to concentrate on a portion (near a position of the end of the turned-up portion of the carcass ply) of the bead above a position at which the convex portion of the rim flange fits into the bead. Therefore, movement of the end of the turned-up portion cannot be reduced.

CITATION LIST

Patent Literature

Patent Literature 1: Japanese Patent No. 3643191

SUMMARY OF THE INVENTION

Problems to be Solved by the Invention

The present invention is made in view of the above situation, and an object, of the present invention is to provide a heavy duty pneumatic tire which can prevent reduction of durability of bead portions while allowing reduction in weight of bead apexes in order to reduce the weight of the tire.

Solution to the Problems

A heavy duty pneumatic tire according to the present invention includes:

a tread having an outer surface that forms a tread surface;

a pair of sidewalls that extends substantially inward, in a radial direction, from ends, respectively, of the tread;

a pair of beads positioned substantially inward of the sidewalls, respectively, in the radial direction; and a clinch portion that extends from the sidewalls to the beads, in which a concave curved surface extends on an outer surface of the clinch portion in a circumferential direction, and a convex curved surface formed on an outer side end, in the radial direction, of a rim flange is engageable with the concave curved surface, a ratio $R1/R2$ of a radius of curvature $R1$ of the concave curved surface to a radius of curvature $R2$ of the convex curved surface of the rim flange, satisfies $$1.7 \leq R1/R2 \leq 3.9,$$

a ratio $D1/R2$ of a depth $D1$ of the concave curved surface to the radius of curvature $R2$ of the convex curved surface satisfies $$0.05 \leq D1/R2 \leq 0.09, \text{ and}$$

the radius of curvature $R1$ of the concave curved surface and the radius of curvature $R2$ of the convex curved surface are each a radius of curvature of an arc on a cross section as taken along a plane including a center axis of the tire.

Preferably, a carcass ply that is extended, along the tread and the sidewalls, on and between both the beads, is further provided, each bead includes a core and a bead apex positioned outward of the core in the radial direction, the carcass ply includes a main body portion and turned-up portions which are formed by the carcass ply being turned up from an inner side toward an outer side around the core, and when $N1$ represents a distance, in the radial direction, to an end of each turned-up portion of the carcass ply from a bead base line that passes through a lower end of the core and is parallel to the center axis of the tire, a ratio $N1/R2$ of the distance N1 in the radial direction to the radius of curvature R2 of the convex curved surface, satisfies $$2.2 \leq N1/R2 \leq 3.8.$$

Preferably, a carcass ply that is extended, along the tread and the sidewalls, on and between both the beads, is further provided, each bead includes a core and a bead apex positioned outward of the core in the radial direction, the carcass ply includes a main body portion and turned-up portions which are formed by the carcass ply being turned up from an inner side toward an outer side around the core, and when T1 represents a thickness of the bead apex at a position of an end of each turned-up portion, a ratio T1/R2 of the thickness T1 to the radius of curvature R2 of the convex curved surface, satisfies $$0.5 \leq T1/R2 \leq 1.0.$$

Advantageous Effects of the Invention

The heavy duty pneumatic tire according to the present invention allows the weight of the tire to be reduced without reducing durability of bead portions.

DESCRIPTION OF EMBODIMENTS

The following will describe in detail the present invention based on preferred embodiments with reference where appropriate to the accompanying drawing.

Figure 1:
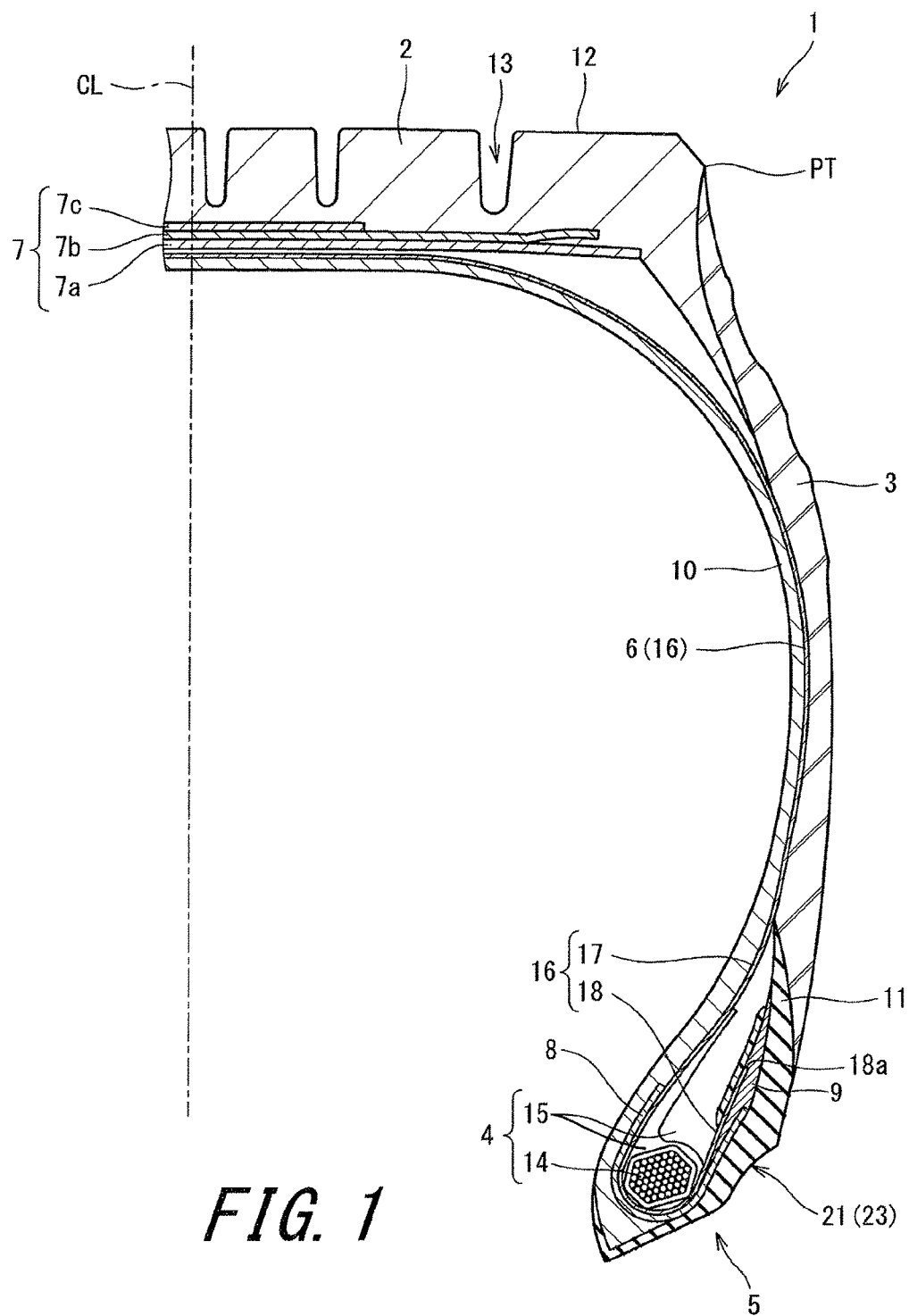
FIG. 1 is a cross-sectional view of a heavy duty pneumatic tire according to one embodiment of the present invention, as taken along a plane including the center axis of the tire.

FIG. 1 illustrates a heavy duty pneumatic tire 1. The tire 1 includes a tread 2, sidewalls 3, beads 4, clinch portions 5, a carcass 6, a belt 7, reinforcing layers 8, cover rubbers 9, an inner liner 10, and chafers 11. The tire 1 is of a tubeless type. The tire 1 is mounted to trucks, buses, and the like. The clinch portions 5 are formed from portions under the sidewalls 3 to the chafers 11 outward of the beads 4.

In FIG. 1, the up-down direction represents a radial direction, the right-left direction represents an axial direction, and the direction perpendicular to the surface of the sheet represents a circumferential direction. The tire 1 has a shape which is substantially bilaterally symmetric about an alternate long and short dash line CL shown in FIG. 1. The alternate long and short dash line CL represents the equator plane of the tire 1. In FIG. 1, reference character PT represents an edge of the tread 2. The edge PT represents a boundary between the tread 2 and each of the sidewalls 3. The tread 2 is formed of a crosslinked rubber excellent in wear resistance. The tread 2 has a shape that projects outward in the radial direction. The outer circumferential surface of the tread 2 forms a tread surface 12 that can contact with a road surface. The tread surface 12 has grooves 13 formed therein. A tread pattern is formed by the grooves 13.

Each sidewall 3 extends from the edge of the tread 2 in substantially radially inward direction. The sidewalls 3 are formed of a crosslinked rubber. The sidewalls 3 prevent the carcass 6 from being damaged.

The beads 4 are disposed inward of the sidewalls 3 in the radial direction. Each bead 4 includes a core 14, and a bead apex 15 that extends outward from the core 14 in the radial direction. The core 14 is ring-shaped, and includes non-stretchable wound wires (typically, steel wires). The bead apex 15 is tapered outward in the radial direction. The bead apex 15 is formed of a highly hard crosslinked rubber.

Figure 2:
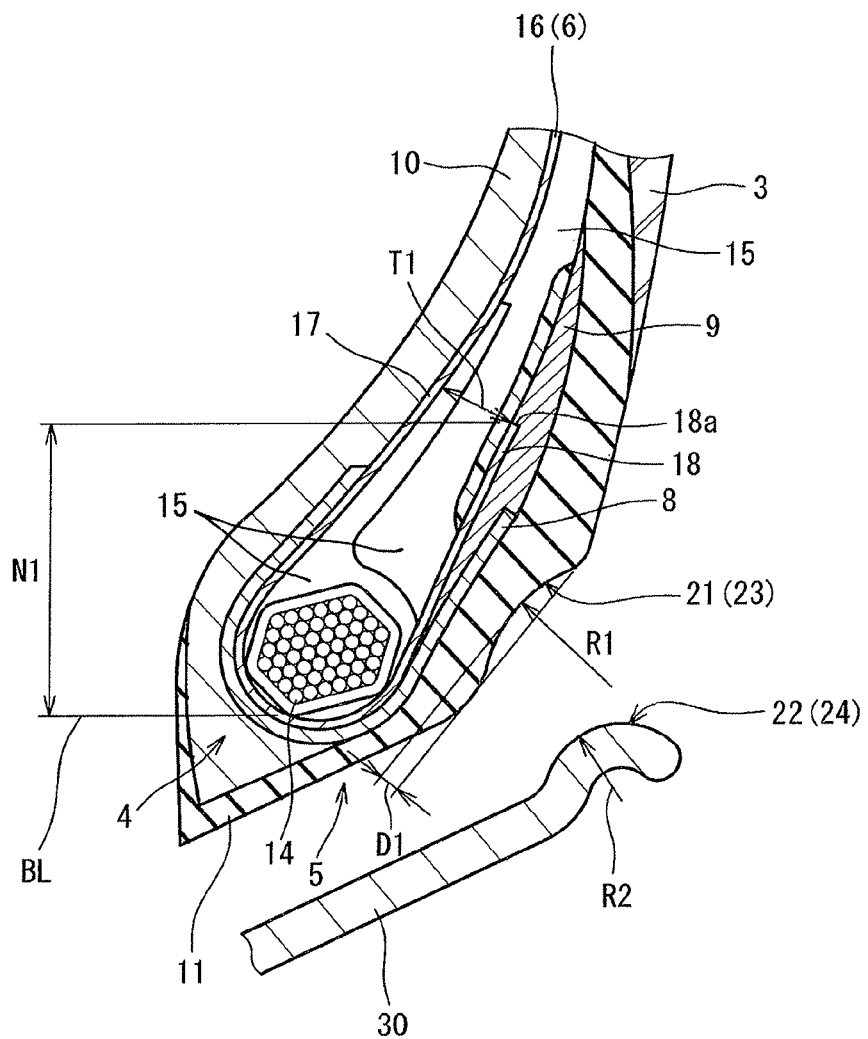
FIG. 2 is an enlarged cross-sectional view mainly illustrating a bead portion of the tire shown in FIG. 1.

The clinch portions 5 are disposed substantially inward of the sidewalls 3 in the radial direction. The clinch portions 5 are disposed outward of the beads 4 and the carcass 6 in the axial direction. As shown in FIG. 2, each clinch portion 5 is engaged with and pressed by a rim flange 30.

The carcass 6 includes a carcass ply 16. The carcass ply 16 is extended along the tread 2 and the sidewalls 3 on and between the beads 4 on both sides. The carcass ply 16 is turned up around each core 14 from the inner side toward the outer side in the axial direction. By the carcass ply 16 being turned up, the carcass ply 16 includes a main body portion 17 and turned-up portions 18. The turned-up portions 18 are layered between the chafers 11 and the bead apexes 15. An end 18a of each turned-up portion 18 is positioned near a mid-portion, in the radial direction, of the bead apex 15.

The belt 7 is layered outward of the carcass 6 in the radial direction. The belt 7 reinforces the carcass 6. In the tire 1, the belt 7 includes a first layer 7a, a second layer 7b, and a third layer 7c. Each of the first layer 7a, the second layer 7b, and the third layer 7c includes multiple cords aligned with each other, and a topping rubber, which is not shown. Each cord is formed of a steel. An organic fiber may be used for the cords. The cords are inclined relative to the equator plane.

The reinforcing layers 8 are wound around the cores 14. The reinforcing layers 8 are layered over the carcass ply 16. Each reinforcing layer 8 includes multiple cords aligned with each other, and a topping rubber. Each cord is formed of a steel. The reinforcing layer 8 may be also referred to as a steel filler. The reinforcing layers 8 contribute to durability of the tire 1.

The cover rubbers 9 are disposed outward of the bead apexes 15 in the axial direction. The cover rubbers 9 are layered over the turned-up portions 18 of the carcass ply 16. The end 18a of each turned-up portion 18 is covered with the cover rubber 9. Concentration of stress on the end 18a is reduced by each cover rubber 9. One end of each reinforcing layer 8 is also covered with the cover rubber 9. Concentration of stress on the one end is reduced by each cover rubber 9.

The chafers 11 are disposed near the beads 4. The chafers 11 extend inward from the sidewalls 3 in the radial direction. When the tire 1 is mounted to a rim, each chafer 11 contacts with the rim flange 30 (FIG. 2). By this contact, regions near the beads 4 are protected. The chafers 11 are typically formed of a fabric and a rubber impregnated into the fabric. The chafers 11 formed of only a rubber may be used.

The inner liner 10 is joined to the inner circumferential surface of the carcass 6. The inner liner 10 extends outward from the chafers 11 in the radial direction. The inner liner 10 is extended on and between the chafers 11 on the right and the left sides. The inner liner 10 is formed of a crosslinked rubber. A rubber that is excellent in air-tightness is used for the inner liner 10. The inner liner 10 functions to maintain an internal pressure of the tire 1.

As shown in FIG. 1 and FIG. 2, on the outer surface of each clinch portion 5, that is, on the outer surface of each chafer 11, a concave curved surface 21 is formed so as to extend in the tire circumferential direction. The concave curved surface 21 is formed on the entirety of the circumference of each side portion of the tire 1. An edge portion of each flange 30 of an incorporated rim can engage with the concave curved surface 21. As shown in FIG. 2, a cross-section of the concave curved surface 21 as taken along a plane including the center axis of the tire 1 represents an arc 23 having a radius of curvature R1. A shape of the concave curved surface 21 is determined by a mold with which a tire is formed. At the edge portion of each rim flange 30, a convex curved surface 22 that is engageable with the concave curved surface 21 is formed. The convex curved surface 22 is formed on the entirety of the circumference of the edge portion of each rim flange 30. As shown in FIG. 2, a cross-section of the convex curved surface 22 as taken along a plane including the center axis of the tire 1 represents an arc 24 having a radius of curvature R2.

The radius of curvature R1 of the arc 23 of the concave curved surface 21 of the clinch portions 5 is set so as to indicate a predetermined value in order to improve durability of the beads 4. Namely, the radius of curvature R1 of the arc 23 of the concave curved surface 21 is set so as to be greater than the radius of curvature R2 of the arc 24 of the convex curved surface 22 in each rim flange 30. A ratio R1/R2 of the radius of curvature R1 of the concave curved surface 21 to the radius of curvature R2 of the convex curved surface 22 satisfies $$1.7 \leq R1/R2 \leq 3.9.$$

When the ratio R1/R2 is less than 1.7 or greater than 3.9, a portion that can reduce movement of the rubber of the sidewall or the like when the tire 1 is under a load, is reduced. This is because, when the ratio R1/R2 is outside the above range, a volume of the concave curved surface 21 is not appropriate. As a result, it may be difficult to reduce movement of the end of the turned-up portion of the carcass ply under a load. Therefore, it may be difficult to assuredly obtain durability of the beads 4.

The concave curved surface 21 has a depth D1. The depth D1 represents a depth of the arc 23 portion, of the concave curved surface 21, having the radius of curvature R1 on the cross-section (FIG. 2) as taken along the plane including the center axis of the tire 1. The depth D1 of the arc 23 portion of the concave curved surface 21 is set as a predetermined depth so as to improve durability of each bead 4. Namely, a ratio D1/R2 of the depth D1 of the arc 23 portion to the radius of curvature R2 of the convex curved surface 22 of the rim flange 30 satisfies $$0.05 \leq D1/R2 \leq 0.09.$$

When the ratio D1/R2 is less than 0.05 or greater than 0.09, a portion that can reduce movement of the rubber of the sidewall or the like when the tire 1 is under a load, is reduced. This is because, when the ratio D1/R2 is outside the above range, a volume of the concave curved surface 21 is not appropriate. As a result, it may be difficult to reduce movement of the end of the turned-up portion of the carcass ply under a load. Therefore, it may be difficult to assuredly obtain durability of the beads 4.

In the above structure, since durability of the beads of the tire 1 is improved, the thickness of each bead apex 15 can be reduced in order to reduce the weight of the tire 1.

Each turned-up portion 18 of the carcass ply 16 preferably has the following length in order to improve durability of the beads 4. Namely, when a distance, in the radial direction, from a bead base line BL to the end 18a of the turned-up portion 18 of the carcass ply 16 is represented as N1, a ratio N1/R2 of the distance N1 to the radius of curvature R2 of the convex curved surface 22 satisfies $$2.2 \leq N1/R2 \leq 3.8.$$

The bead base line BL represents a straight line that passes through the lower end of the core 14 and is parallel to the center axis of the tire.

When the ratio N1/R2 is less than 2.2, the turned-up portion 18 is excessively short, whereby the turned-up portion 18 is likely to be removed from the bead apex 15 after forming process. On the other hand, when the ratio N1/R2 is greater than 3.8, the turned-up portion 18 is elongated, and the end 18a of the turned-up portion 18 is likely to be positioned in a range of the tire side portion where distortion is great under a load. As a result, movement of the end 18a of the turned-up portion 18 is increased under a load, whereby durability of the beads 4 may not be improved.

In the present embodiment, the thickness of the bead apex 15 is reduced in order to reduce the weight of the tire 1. Specifically, a thickness T1 (FIG. 2) of the bead apex 15 at a position of the end 18a of each turned-up portion 18 is preferably limited so as to be within a predetermined range described below. In other words, the thickness T1 represents a distance of a portion sandwiched by the carcass ply 16 at the position of the end 18a of the turned-up portion 18. The predetermined range for the thickness T1 is preferably determined such that a ratio T1/R2 of the thickness T1 to the radius of curvature R2 of the convex curved surface 22 satisfies $$0.5 \leq T1/R2 \leq 1.0.$$

When the ratio T1/R2 is less than 0.5, the thickness of the side portion is reduced. As a result, movement of the end of the turned-up portion of the carcass ply is increased under a load, whereby durability of the beads 4 may not be improved. On the other hand, when the ratio T1/R2 is greater than 1.0, the thickness of the bead apex 15 is increased, whereby it may be difficult to reduce the weight.

For the heavy duty pneumatic tire 1 having the above structure, a test for evaluating bead durability performance, and a measurement for evaluating the weight of the bead apex portions are performed. The test for evaluating bead durability performance is made by using a bench test machine having a driving drum. The size of the test tire 1 is 11R22.5. The test tire 1 is mounted to a test rim having a rim width of 8.25×22.5. The convex curved surface 22 is formed at an edge portion of a flange portion of the test rim. The test internal pressure for the test tire is 700 kPa as is specified in the JATMA standard. A vertical load applied to the test tire is 81.75 kN that is three times a load (27.25 kN) which is specified in the JATMA standard. The vertical load is a load that is applied to the tire in the tire radial direction. The test tire is run under this load by the driving drum. The running speed is 20 km/h. The running time that elapses before the bead portion of the test tire 1 is damaged is measured and recorded. The test tire for which a longer running time is measured, is more excellent in bead durability performance.

The measurement for evaluating the weight of the bead apex portions is performed. The weight of the bead apex 15 is measured before the test tire 1 is formed. The less a measured value is, the less the weight is.

EXAMPLES

Hereinafter, effects of the present invention will become apparent according to examples. However, the present invention should not be restrictively construed based on the description of examples.

Example 1 to 5

As tires of examples 1 to 5, the heavy duty pneumatic tire 1 having the concave curved surface 21 as shown in FIG. 1 and FIG. 2 was produced. The size of the tire 1 was 11R22.5. The numerical factors (the ratio R1/R2, the ratio D1/R2 as described above) of the concave curved surface 21 were as indicated in Table 1. Values of the distance N1 from the bead base line BL to the end 18a of the carcass ply 16 were also as indicated in Table 1. Values of the thickness T1 of the bead apex 15 at a position of the end 18a of the turned-up portion 18 were also as indicated in Table 1. For the test tires 1, bead durability evaluation test and measurement of the weight of the bead apex as described above were performed. In the bead durability evaluation test, each test tire 1 was mounted to the rim flange 30 having the convex curved surface 22. The test internal pressure for the tire was 700 kPa. The vertical load applied to the tire was 81.75 kN. The running speed of the tire was 20 km/h. The test results (evaluation results) and results of the weight measurement as described above are indicated in Table 1.

Example 6 to 10

As tires of examples 6 to 10, the heavy duty pneumatic tire 1 having the concave curved surface 21 as shown in FIG. 1 and FIG. 2 was produced. For these test tires 1, the numerical factors of the concave curved surface 21, and values of the distance N1 from the bead base line BL to the end 18a of the carcass ply 16 and the thickness T1 of the bead apex 15, were as indicated in Table 2. The other structure and test conditions for the tires 1 were the same as those for the above-described example 1. The test results (evaluation results) for the tires 1 are indicated in Table 2.

Comparative Example 1

As a tire of comparative example 1, a heavy duty pneumatic tire was produced. The test tire did not have the concave curved surface 21. The values of the distance N1 from the bead base line BL to the end 18a of the carcass ply 16 and the thickness T1 of the bead apex 15 of the test tire were as indicated in Table 1. The other structure and test conditions for the tire were the same as those for the above-described example 1. The test results (evaluation results) for the tire are indicated in Table 1.

Comparative Example 2

As a tire of comparative example 2, a heavy duty pneumatic tire was produced. The test tire did not have the concave curved surface 21. The values of the distance N1 from the bead base line BL to the end 18a of the carcass ply 16 and the thickness T1 of the bead apex 15 of the test tire were as indicated in Table 2. The other structure and test conditions for the tire were the same as those for the above-described example 1. The test results (evaluation results) for the tire are indicated in Table 2.

Comparative Example 3

As a tire of comparative example 3, a heavy duty pneumatic tire was produced. For the test tire, the numerical factors of the concave curved surface 21, and the values of the height N1 distance N1 from the bead base line BL to the end 18a of the carcass ply 16 and the thickness T1 of the bead apex 15, were as indicated in Table 2. The other structure and test conditions for the tire were the same as those for the above-described example 1. The test results (evaluation results) for the tire are indicated in Table 2.

Comparative Example 4 to 7

As tires of comparative examples 4 to 7, heavy duty pneumatic tires were produced. For these test tires, the numerical factors of the concave curved surface 21, and the values of the distance N1 from the bead base line BL to the end 18a of the carcass ply 16 and the thickness T1 of the bead apex 15, were as indicated in Table 3. The other structure and test conditions for these tires were the same as those for the above-described example 1. The test results (evaluation results) for the tires are indicated in Table 3.

TABLE 1

| | Evaluation results | | | | | |
|---|---|---|---|---|---|---|
| | Comp. Ex. 1 | Ex. 1 | Ex. 2 | Ex. 3 | Ex. 4 | Ex. 5 |
| Ratio R1/R2 | None | 2.2 | 1.7 | 3.9 | 2.8 | 2.8 |
| Ratio D1/R2 | None | 0.08 | 0.07 | 0.07 | 0.05 | 0.09 |
| Ratio N1/R2 | 2.9 | 2.5 | 3.0 | 3.0 | 3.0 | 3.0 |
| Ratio T1/R2 | 1.0 | 0.8 | 0.7 | 0.7 | 0.7 | 0.7 |
| Weight index | 100 | 70 | 75 | 75 | 75 | 75 |
| Bead durability | 100 | 135 | 120 | 100 | 100 | 130 |

TABLE 2

| | Evaluation results | | | | | | |
|---|---|---|---|---|---|---|---|
| | Ex. 6 | Ex. 7 | Ex. 8 | Ex. 9 | Ex. 10 | Comp. Ex. 2 | Comp. Ex. 3 |
| Ratio R1/R2 | 2.8 | 2.8 | 2.8 | 1.7 | 3.9 | None | 1.5 |
| Ratio D1/R2 | 0.06 | 0.06 | 0.06 | 0.09 | 0.05 | None | 0.11 |
| Ratio N1/R2 | 1.5 | 3.0 | 3.0 | 2.2 | 3.8 | 3.9 | 2.1 |
| Ratio T1/R2 | 0.7 | 1.1 | 0.4 | 1.0 | 0.5 | 0.3 | 0.9 |
| Weight index | 65 | 115 | 70 | 85 | 70 | 60 | 80 |
| Bead durability | 90 | 100 | 90 | 115 | 100 | 60 | 85 |

TABLE 3

| | Evaluation results | | | |
| --- | --- | --- | --- | --- |
| | Comp. Ex. 4 | Comp. Ex. 5 | Comp. Ex. 6 | Comp. Ex. 7 |
| Ratio R1/R2 | 4.0 | 1.0 | 2.8 | 2.8 |
| Ratio D1/R2 | 0.04 | 0.01 | 0.04 | 0.10 |
| Ratio N1/R2 | 2.5 | 2.5 | 2.5 | 2.5 |
| Ratio T1/R2 | 1.1 | 0.7 | 0.7 | 0.7 |
| Weight index | 100 | 65 | 65 | 65 |
| Bead durability | 95 | 70 | 95 | 80 |

[Evaluations]

In Tables 1 to 3, performance evaluation results of the tires according to examples 1 to 10 and comparative examples 1 to 7 are indicated. The results of the bead durability evaluation test are indicated as indexes with the result of comparative example 1 being 100. The greater the index is, the better the performance is. The results of the measurement of the weight of the bead apex portions are also indicated as indexes with the result of comparative example 1 being 100. The less the index is, the better the result is. The evaluation results clearly indicate that the present invention is superior.

INDUSTRIAL APPLICABILITY

The heavy duty pneumatic tire as described above is applicable to various vehicles such as trucks and buses.

DESCRIPTION OF THE REFERENCE CHARACTERS

1 . . . tire
2 . . . tread
3 . . . sidewall
4 . . . bead
5 . . . clinch pertion
6 . . . carcass
14 . . . core
15 . . . bead apex
16 . . . carcass ply
17 . . . main body portion
18 . . . turned-up portion
21 . . . concave curved surface (of clinch portion)
22 . . . convex curved surface (of rim flange)
23 . . . arc (of concave curved surface)
24 . . . arc (of convex curved surface)
30 . . . rim flange
CL . . . equator plane
R1 . . . radius of curvature of arc (of concave curved surface)
R2 . . . radius of curvature of arc (of convex curved surface)
D1 . . . depth of arc portion (of concave curved surface)
N1 . . . height of position of end (of turned-up portion)
T1 . . . thickness of bead apex

The invention claimed is:

1. An assembly comprising a heavy duty pneumatic tire, and a tire rim flange,
wherein the heavy duty pneumatic tire comprises:
a tread having an outer surface that forms a tread surface;
a pair of sidewalls that extends substantially inward, in a radial direction, from ends, respectively, of the tread;
a pair of beads positioned substantially inward of the sidewalls, respectively, in the radial direction; and
a clinch portion that extends from the sidewalls to the beads; and
a concave curved surface extends on an outer surface of the clinch portion in a circumferential direction, the concaved curved surface being the whole concaved portion of the outer surface of the clinch portion, and being composed of a single arc, on a cross section as taken along a plane including a center axis of the tire, and
wherein:
the tire rim flange comprises a convex curved surface formed on an outer side end, in the radial direction, of the tire rim flange, and the convex curved surface of the tire rim flange engages with the concave curved surface,
a ratio R1/R2 of a radius of curvature R1 of the concave curved surface to a radius of curvature R2 of the convex curved surface of the rim flange, satisfies $1.7 \leq R1/R2 \leq 3.9$, a ratio D1/R2 of a depth D1 of the concave curved surface to the radius of curvature R2 of the convex curved surface satisfies $0.05 \leq D1/R2 \leq 0.09$, and the radius of curvature R1 of the concave curved surface and the radius of curvature R2 of the convex curved surface are each a radius of curvature of an arc on the cross section as taken along the plane including the center axis of the tire.

2. The assembly according to claim 1, further comprising a carcass ply that is extended, along the tread and the sidewalls, on and between both the beads, wherein
each bead includes a core and a bead apex positioned outward of the core in the radial direction,
the carcass ply includes a main body portion and turned-up portions which are formed by the carcass ply being turned up from an inner side toward an outer side around the core, and
when N1 represents a distance, in the radial direction, to an end of each turned-up portion of the carcass ply from a bead base line that passes through a lower end of the core and is parallel to the center axis of the tire, a ratio N1/R2 of the distance N1 in the radial direction to the radius of curvature R2 of the convex curved surface, satisfies $2.2 \leq N1/R2 \leq 3.8$.

3. The assembly according to claim 1, further comprising a carcass ply that is extended, along the tread and the sidewalls, on and between both the beads, wherein
each bead includes a core and a bead apex positioned outward of the core in the radial direction,
the carcass ply includes a main body portion and turned-up portions which are formed by the carcass ply being turned up from an inner side toward an outer side around the core, and
when T1 represents a thickness of the bead apex at a position of an end of each turned-up portion, a ratio T1/R2 of the thickness T1 to the radius of curvature R2 of the convex curved surface, satisfies $0.5 \leq T1/R2 \leq 1.0$.

4. The assembly according to claim 2, further comprising a carcass ply that is extended, along the tread and the sidewalls, on and between both the beads, wherein each bead includes a core and a bead apex positioned outward of the core in the radial direction, the carcass ply includes a main body portion and turned-up portions which are formed by the carcass ply being turned up from an inner side toward an outer side around the core, and when $T1$ represents a thickness of the bead apex at a position of an end of each turned-up portion, a ratio $T1/R2$ of the thickness $T1$ to the radius of curvature $R2$ of the convex curved surface, satisfies $0.5 \leq T1/R2 \leq 1.0$.

5. The assembly according to claim 1, wherein the convex curved surface of the tire rim flange engages with the concave curved surface under a normally inflated and unloaded state.

* * * * *